United States Patent
Joffray et al.

(10) Patent No.: US 10,013,841 B2
(45) Date of Patent: Jul. 3, 2018

(54) METHOD FOR PERSONALISING AN ELECTRONIC DEVICE, ASSOCIATED DATA PROCESSING METHOD AND DEVICE

(75) Inventors: Olivier Joffray, Feucherolles (FR); Jean-Michel Desjardins, Plaisir (FR)

(73) Assignee: GEMALTO SA, Meudon (FR)

(*) Notice: Subject to any disclaimer, the term of this patent is extended or adjusted under 35 U.S.C. 154(b) by 0 days.

(21) Appl. No.: 13/262,950

(22) PCT Filed: Apr. 1, 2010

(86) PCT No.: PCT/EP2010/054411
§ 371 (c)(1),
(2), (4) Date: Jan. 12, 2012

(87) PCT Pub. No.: WO2010/115840
PCT Pub. Date: Oct. 14, 2010

(65) Prior Publication Data
US 2012/0102278 A1     Apr. 26, 2012

(30) Foreign Application Priority Data

Apr. 9, 2009 (EP) .................................... 09305309

(51) Int. Cl.
*G06F 13/00* (2006.01)
*G07F 7/10* (2006.01)
*G06Q 20/34* (2012.01)

(52) U.S. Cl.
CPC ........... *G07F 7/10* (2013.01); *G06Q 20/3574* (2013.01); *G06Q 20/3576* (2013.01)

(58) Field of Classification Search
CPC .......... G06F 12/00; G06F 12/28; G06F 17/00; G06F 17/60; G06F 15/163
See application file for complete search history.

(56) References Cited

U.S. PATENT DOCUMENTS 5,832,483 A * 11/1998 Barker .................... G06F 9/468
5,974,145 A    10/1999 Feiken
7,010,701 B1    3/2006 Bossemeyer, Jr. et al.
(Continued)

FOREIGN PATENT DOCUMENTS

EP     0 770 976 A1    5/1997
EP     1 544 809 A2    6/2005

OTHER PUBLICATIONS

International Search Report (PCT/ISA/210) dated Jul. 21, 2010, by European Patent Office as the International Searching Authority for International Application No. PCT/EP2010/054411.
(Continued)

*Primary Examiner* — Charles Rones
*Assistant Examiner* — Han Doan
(74) *Attorney, Agent, or Firm* — Buchanan Ingersoll & Rooney PC

(57) ABSTRACT

The invention relates to any electronic device such as a chip card, a passport, a dongle or any other object requiring personalization of the content of a memory. More precisely, the invention provides for a method for processing a data item of a container stored in a memory, said method being implemented by the electronic device by utilizing in particular a table of identifiers. The invention furthermore provides for a prior step for associating a data identifier with a data item of a container and creating said table of identifiers.

13 Claims, 1 Drawing Sheet

(56) References Cited

U.S. PATENT DOCUMENTS

| | | | |
|---|---|---|---|
| 2002/0169934 A1* | 11/2002 | Krapp | G06F 17/30067 |
| | | | 711/159 |
| 2003/0163351 A1* | 8/2003 | Brown | A61B 5/0002 |
| | | | 705/2 |
| 2005/0132151 A1* | 6/2005 | Kuriyama | G06F 21/445 |
| | | | 711/154 |
| 2006/0059194 A1* | 3/2006 | Oh | G06F 21/445 |
| 2006/0080554 A1* | 4/2006 | McDonald | G06F 21/6254 |
| | | | 713/189 |
| 2007/0033375 A1* | 2/2007 | Sinclair | G06F 12/0246 |
| | | | 711/203 |
| 2007/0250921 A1* | 10/2007 | LiVecchi | H04L 63/105 |
| | | | 726/7 |
| 2009/0077304 A1* | 3/2009 | Hong | G06F 12/0862 |
| | | | 711/103 |
| 2010/0144367 A1* | 6/2010 | Goh | G01S 5/0294 |
| | | | 455/456.1 |

OTHER PUBLICATIONS

Written Opinion (PCT/ISA/237) dated Jul. 21, 2010, by European, Patent Office as the International Searching Authority for International Application No. PCT/EP2010/054411.

* cited by examiner

METHOD FOR PERSONALISING AN ELECTRONIC DEVICE, ASSOCIATED DATA PROCESSING METHOD AND DEVICE

The invention relates to the field of electronic devices requiring personalisation of data stored in one or several memories. The invention more particularly, but in a not limited way, relates to secured portable electronic devices such as chip cards, electronic passports or any other object containing data, some of which are personal and dedicated to an owner or a user. Such devices are more particularly applied in the field of health, banking, telecommunications or identity checks.

A chip card, for example, as a safety module of a person subscribing to a wireless telecommunication service or a debit card, is first produced by a card manufacturer before being handed over to a user. The plastic body of the card is generally graphically personalised with the colours of a telecommunication or banking operator.

Therefore, the chip includes an electronic calculator communicating with the outside world using electric contacts or an antenna. The electronic calculator also includes one or several memories, a processing unit able to provide for and implement processing methods relating to the content of said memories. For example, the outside world can request the processing unit to write a piece of information into a data memory using a writing command supported by the processing unit. Upon reception of such a command, the processing unit updates the content of a memory using a value and an address which are transmitted thereto as parameters of the writing command. The same is true for reading a piece of information previously written in a memory.

In order to give a structure to the content of a memory in an electronic device, a tree structure of files which are grouped in directories is often used. Then, for example, the balance of an electronic purse is materialised by a data item contained in the record of a file which is itself contained in the directory. Said record or directly the file is currently called the "container" of the purse "balance" data item.

A payment card is a secured object. For this type of product, it is necessary, prior to implementing a debit operation, to perform the authentication of the card user. The latter must enter a secret code which is personal to him or to her. A secret reference data item, which is compared with the value entered by the user, is also contained in a container of the card. This container can be a record of a file or a file dedicated to security. The container can also be a directory.

In this case, said reference value belongs to the "system" data of a descriptor materialising said directory. Whatever the nature of the container, the initial value of a purse, the reference value of a secret code or the name of a chip card user must be written into the memory of that card before the latter can be handed over to the user. Such values are dedicated to a single person: the card final user. This type of information is generally not initialised by the card manufacturer. The latter sells batches of identical cards to an operator which is responsible for personalising these, one by one, for each one of its users or customers. This is called the step of electric personalisation of an electronic device.

In order to implement an electronic personalisation process, it is known to request the card or passport manufacturer to initialise all the data common to a batch of cards or passports. Then, in the example of a memory structure as a file tree, the manufacturer initialises the content of the memory of each card or passport using directories and/or files, the content of which is written, except for the data which will be specific to the future user of the card or the passport.

When opening a user banking account, a banking operator must personalise a card by writing, in turn, said user's specific data. Therefore, the user uses one or several writing commands in order to finalise the card personalisation.

Depending on the known solutions, this personalisation requires a number which can be a substantial number of writing commands and selection commands in order to identify the files concerned by the writing operations. The more numerous the commands, the more expensive the personalisation process for an operator.

In order to remedy this drawback, it is provided for example to offer the operators personalisation commands which belong to their applications and enable a direct access to the data to be personalised. However, this solution also requires the locations in the memory of said data to be standardised and known. In addition, this requires making available writing commands dedicated to such data and to a special application. Now, the devices are more and more complex. They often support a plurality of applications which can also evolve over time. Then, using this type of adapted and dedicated commands is inappropriate.

Document EP-A-1 544 809 describes the implementation of control operations in a portable electronic device including several logic channels to have access to data in the device. In answer to requests for access received from the outside. Pointer information making it possible to have access to files are defined for each logic channel in the control means.

When receiving a file selecting command mentioning a logic command and a logic channel, the control means gives access to the file based on the corresponding pointer information. In order to define the commands including the logic channel and the identification of files, the outside world must know the architecture of the files in the device as well as the various logic channels giving access thereto. Such control operations make it possible to prevent a data item read on a channel to be modified via a command emitted on another channel.

The invention aims at remedying the drawbacks of the prior art by providing the possibility of processing in a quick and efficient way the data to be personalised in an electronic device whatever the nature of the data, more particularly if said data containers cannot be mastered and/or known a priori.

For this purpose, the method is provided for processing a data item of a container stored in a first memory of an electronic device, including:
 a step of consulting associating means, with said associating means enabling to associate a data item of a container with a data identifier and a data reference;
 a step of processing said data item by using said data reference.

According to one characteristic of the invention, the processing step, more particularly a data item reading or writing processing, is executed in answer to commands, more particularly for reading or writing, without using a file or container selection command (or an equivalent) upon the processing, more particularly reading or writing processing.

According to another characteristic, said reference data (associated with a data identifier) enables to point the container data in the first memory.

According to a preferred embodiment, the step of consulting of such a method may consist in reading an entry of a table of identifiers, with said table being stored in a second memory of the device, with said entry being dedicated to the data item to be processed and including the data identifier and the data reference.

According to this embodiment, the processing step can depend on the correct execution of a prior step of authorising said processing step. For this purpose, the authorising step can use a security identifier further existing in the entry of the table of identifiers associated with the processed data item.

The invention provides that the data reference can make it possible to directly point the container data in the first memory so that the processing step may consist in reading or modifying the data item by using the data reference.

According to an alternative solution, the processing step may consist in applying a processing script to the data item by using, for example, in the entry of a table of identifiers the data reference and a processing script reference further existing in the entry of the table of identifiers and enabling to point a processing script stored in a third memory of the device.

In addition the invention provides the possibility of providing a processing method including previously:
- a step of creating a data container or of selecting a data item of a container for initialising means for pointing said data item in the first memory of the device;
- a step of associating with the data item a data identifier and a data reference the value of which is defined by using the pointing means initialised by the step of creating the container or of selecting the data item.

According to a first embodiment, the associating step may consist in creating an entry in the table of identifiers, with said entry being dedicated to the data item and including the data identifier and the data reference.

The step of creating an entry in such a method may further consist in providing in the entry of the table of identifiers a safety identifier for making a future processing of the considered data item depend on the correct execution of an authorising step.

Said step of creating an entry may further consist in providing in the entry of the table of identifiers a script reference, with said reference enabling to point a processing script stored in a third memory of the device.

According to an alternative solution, a method according to the invention may include a step for sorting the table of identifiers so that the entries of the table of identifiers including an identical safety identifier are for example contiguous in the table of identifiers.

As an alternative solution, the method can sort the table of identifiers so that the entries in the table of identifiers associated with data intended to be processed according to a similar or simultaneous processing step are contiguous in the table of identifiers.

The invention further provides to adapt an electronic device including a first memory for storing a data item in a container so that it includes:
- means for consulting the associating means, with said associating means enabling to associate a data item of a container with a data identifier and a data reference;
- means for processing said data item by using said data reference with said data reference enabling to point the data item of the container in the first memory.

According to a preferred embodiment, the associating means may consist in a second memory for containing a table of identifiers and means for processing a data item of a container are able to implement a processing method using said table of identifiers.

Such an electronic device may further include a third memory for containing a processing script so that the means for processing a data item of a container can implement a processing method using said script.

The invention also relates to an electronic device further including:
- means for pointing a data item of a container stored in the first memory of the device;
- means for initialising the associating means for associating an identifier with a data item of a container able to implement a method according to the invention.

Other characteristics and advantages will appear more clearly when reading the following description and referring to the appended drawings among which:

Figure 1:
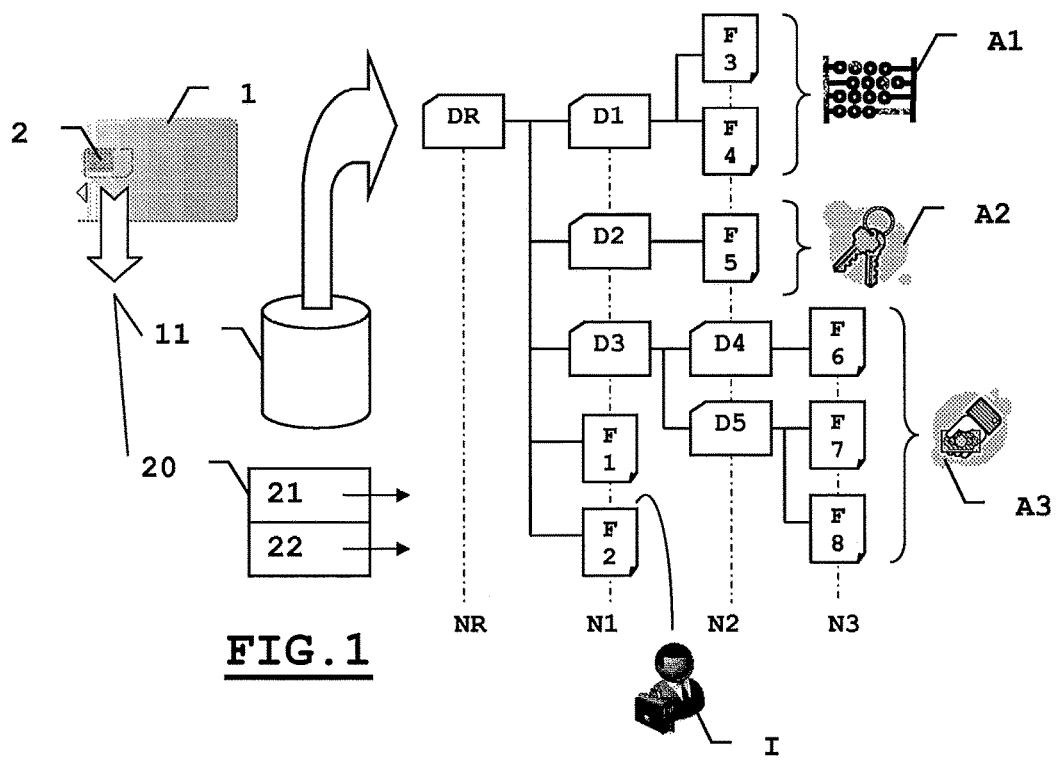
FIG. 1 shows a known memory structure according to a tree structure of files and directories.

FIG. 1 illustrates a known representation of the content of a memory 11 in an electronic device 1 such as a chip card the electronic calculator of which hosts a plurality of applications, A1, A2, A3. According to this 4-level NR, N1, N2 and N3 tree representation, F1 to F8 files are grouped using D1 to D5 directories. The main directory or root directory is DR. It groups F1 and F2 files as well as three other N1-level directories: D1, D2 and D3. The D1 directory groups the F3 and F4 files. The D2 directory contains a single F5 file. The D3 directory (having the same N1 level as D2 and D2) groups two lower level N2 directories: D4 and D5. The D4 and D5 directories in turn respectively group the F6 file and the F7 and F8 files.

The data in the electronic device 1 are then distributed and classified. According to the example relating to FIG. 1, the memory 11 includes several applications, A1, A2, A3. The D1 directory is thus dedicated to the data of a loyalty A1 application. The value of one or several counters is the data item of a container: the F3 file. The D2 directory is dedicated to the data of an access control A2 application. The F5 file is the container of a list of access points which are authorised to the card user. The D3 directory is dedicated to the data required for supporting an application A3 of the electronic purse type.

The directory D5 then hosts on the one hand the F7 file which is the container of the purse current balance, the F8 file which is the container of the history of the last debit and/or credit operations. In addition, since this type of application requires a high level of security, the F6 file makes it possible to store the reference value of a secret dedicated to the card user.

According to an alternative solution, the reference value of said secret could be written using a data structure complementing the system data associated with the D4 directory instead of the F6 file.

Eventually, according to the example relating to FIG. 1, the F2 file makes it possible to store I information, among which the card user's name and Christian name. Both pieces of information are stored in two distinct records of the F2 file, thus forming each a data container. The F1 file contains a card expiry date beyond which the card can no longer be used.

Having a current directory and file selection command is known. Such commands traditionally enable to update pointing means 20, generally as two pointers 21 and 22 respectively containing the addresses of the current directory and file. Then, it is possible to apply writing or reading command, or more generally a data processing command within a file selected in a current directory.

According to the example relating to FIG. 1 and according to the state of the art, in order to update the initial value of the electronic purse balance, it is necessary to transmit the card a first command for selecting a D3 directory dedicated to the A3 application after powering the card on. A second command for selecting the D5 directory is also required for selecting the D5 directory and defining the latter as the new current directory. A third command must in addition be transmitted for selecting the F7 file as the current file. A command for writing the balance data item of the current F7 file container follows.

Still according to this example, in order to update the history of the debit and/or credit operations, data in the F8 file must be initialised. Therefore, a command for selecting a current file is again required for defining F8 as the new current file. In the case of a F8 file containing several records, a series of writing commands is transmitted to the card in order to update each data container respectively materialised by each record of F8. Now, in order to initialise the secret data contained in the F6 file, a command for selecting the parent directory of D5 must be applied so that D3 can be considered as the current directory and then a command for selecting the directory D4 must be applied so that the latter can in turn become the current directory. The next command is a command for selecting the file F6 so that the latter can be considered as the current file. The secret reference value can then be written.

It may be necessary beforehand to execute an authorisation check prior to modifying such secret. When this step is completed, a command for writing the secret reference value can be transmitted to the card in order to initialise the data item of the F6 container.

Other examples could be used, such as the initialisation of data in F2 to F5 files.

It can be noted that the various writing steps require an important series of commands of selection of directories and files in order to update the pointing means. Such commands cause the extension of the duration of the personalisation process and to make the latter expensive for the operator.

In addition, the nature of the writing commands may vary according to whether a file contains only one data item or several data items, whether the file is in the form of a single container or a plurality of containers. Depending on the applications existing in the card, the syntax, the authorisations, the settings of the writing commands may in addition be different in order to update the content of the files belonging to a directory respectively dedicated to distinct applications making the electric personalisation process difficult to implement.

The invention makes it possible to solve the above-mentioned drawbacks by providing according to a preferred embodiment a table of identifiers in a memory of the card or any other electronic device adapted accordingly.

Figure 2:
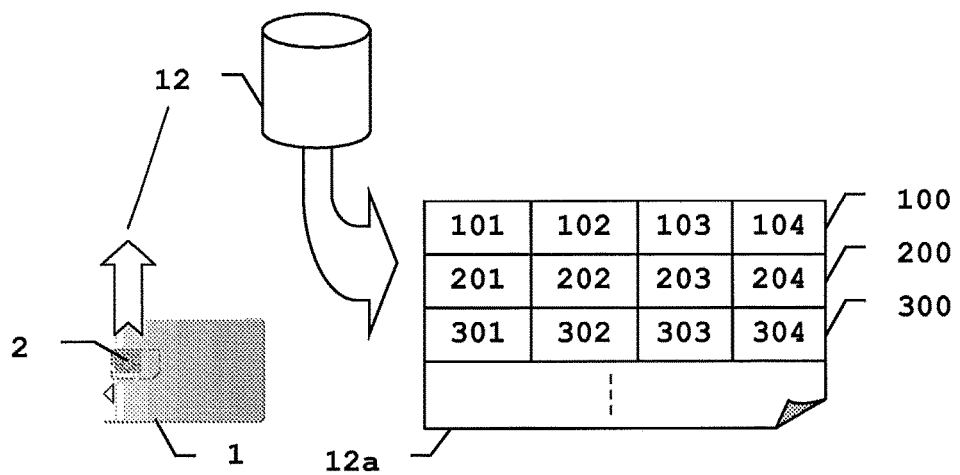
FIG. 2 shows an exemplary table of identifiers according to the invention.

FIG. 2 makes it possible to illustrate such an embodiment of the invention. In addition to a memory 11, optional pointing means 20 similar to those illustrated in FIG. 1, the electronic calculator 2 of a chip card 1 according to the invention is adapted for including a memory 12 for storing a table of identifiers 12a.

The adaptation may consist in giving the calculator said second memory 12. As an alternative solution, the adaptation may consist in providing the calculator with means giving a writing- and reading-access to a second remote memory 12. According to this second alternative solution, said second memory 12 is a memory of a third party electronic device able to create a wire or a contactless communication with the chip card 1 according to the invention.

For simplicity, these two alternative embodiments will be referred to as "a second memory 12 of the device according to the invention".

The table of identifiers 12a includes one or several entries. In the example illustrated in FIG. 2, three entries 100, 200 and 300 are shown. Each entry includes a plurality of fields 101 to 104, 201 to 204 and 301 to 304, some of which are compulsory and some others optional. The first field, such as 101, 201 and 301, is compulsory for any entry in a table of identifiers such as the table 12a. It corresponds to a data identifier of a container.

In a preferred embodiment of the invention, the value of a data identifier is unique. A second field, such as 102, 202, 302 of an entry of a table of identifiers, such as table 12a, is compulsory. It corresponds to a data reference of a container. This data reference enables the processing unit of the calculator 2 to point precisely in the memory 11 the data the value of which is to be processed.

The calculator 2 according to the invention is adapted for making available to the outside world one or several command(s) of said processing commands able to process a data item stored in a memory 11 of said calculator by using a table of identifiers, such as the table 12a.

According to a first exemplary processing command, let us consider a writing command for initialising at a value BALINIT a data item corresponding to the balance of an application of the electronic purse. Let us assume that a memory 11 such as the one described in relation with FIG. 1 has previously been initialised in the calculator 2 of the chip card 1. The data item desired to be processed exists in the F7 container of the D5 directory. According to this example, a table of identifiers 12a stored in the memory 12 of the calculator 2 includes an entry 100 a first field 101 of which corresponds to an identifier assigned to the data item corresponding to said balance. The value of the data identifier can take any value in so far as the latter enables to identify the electronic purse balance data item.

As an example, the hexadecimal value 0x01 can be used. The entry 100 further includes a field 102 to point the data item in the memory 11. This reference can be an address which can be directly used by the calculator 2. The reference can also be in the form of a couple of points such as values 21 and 22 of the pointing means 20 of the calculator 2 so that the latter can find directly the D5 directory and the F7 file where the data item is stored. The fields 103 and 104 shown in FIG. 2 can be absent or have a neutral value since the latter are not useful for processing this data item.

Let us use a second example: the initialisation of the reference value of a personal secret required for authenti-fying a card user. Such a piece of information corresponds to a data item of the F6 container of the D4 directory. In order to update this data item, the table 12a includes an entry 200 including a data identifier 201 the value of which, for example equals to 0x02, has been assigned to the data item representing the secret reference value. The entry 200 further includes a field 202 enabling to directly point in the memory 11 the data item contained in F6 within the D4 directory.

According to our example, let us consider that a prior step of authorisation is required for modifying the secret reference value. A field 203 is present therefore in the entry 200. The value of this field makes it possible to specify a requested safety level. Such value can be a code representing a security level or the reference of the secret code or a key, an authentication algorithm, etc. Eventually, a field 204 shown in FIG. 2 can be absent or include a neutral value.

As a third example, let us consider the F8 file in order to contain the history of the debit/credit operations. Such a history can for example mention the last five operations. Five records are then provided for, and require initialising and formatting. According to a first method, as many data identifiers as records can be assigned and it can thus have as many entries available in the table 12a. According to an alternative solution, the five records can be considered as a whole, i.e. a unique data item which is complex and a unique entry in the table 12a can be associated thereto.

FIG. 2 makes it possible to illustrate this alternative solution. An entry 300 is thus provided in the table 12a. A first field 301 corresponds to the data identifier associated with the "history" data item. The value of this field can for example be 0x03. A field 302 makes it possible to precisely point the "history" data item in the memory 11.

As the updating of the history does not require any prior security mechanism, the field 303 can be absent or include a neutral value. The entry 300 further includes a field 304 for containing a reference of the "history" data processing script. This script may for example include a series of writing operations which can be implemented by the calculator 2. This processing programme or script can be stored in a third memory of the calculator 2 which is not shown in FIG. 2. According to this alternative solution, the "history" data processing command using the table 12a can be compared to the execution of a processing script on a data item pointed by the field 302.

The invention provides for several embodiments for formatting and using the fields of one entry of the table of identifiers. The respective size of said fields can be predefined. According to an alternative solution, the invention can provide for the use of markers and information on the field length. More generally, the invention cannot be limited by the selection of a particular formatting method for a table of identifiers nor by the number and/or the nature of the fields existing in one entry of the table.

One table of identifiers per application or more generally a plurality of tables of identifiers could also be provided for within the memory of a device adapted according to the invention. More generally, the invention provides for the adaptation of an electronic device in order to provide it with means for associating with the data item of a container at least one identifier and one data reference, with the table of identifiers being only one preferred embodiment.

According to this preferred embodiment, the invention further provides for a command for sorting the entries of a table of identifiers so that the entries requesting for example the same security levels can be contiguous in the table of identifiers. Thus, in relation with FIG. 2, a sorting of the table of identifiers 12a can be implemented by the device 1 so that the entries 100, 200 or 300 of the table of identifiers including an identical safety identifier 103, 203 or 303 can be contiguous in the table of identifiers 12a. This possibility makes it possible to optimise the time required for executing the electric personalisation. As a matter of fact, the processing steps can thus be grouped according to their security level and thus the prior authorisation mechanism can be executed in the correct number. Other criteria could be used for grouping the processing steps, for example depending on the nature of the containers, the proximity of the memory locations, etc.

A table of identifiers can be created and initialised according to any type of process.

However, the invention provides for a particularly efficient method for creating a table of identifiers and thus prepares the processing step or steps.

According to a preferred embodiment, the invention provides for a method for assigning an identifier to a data item of a container existing in a memory of an electronic device. This method makes it possible to initialise the means for associating with a data item of a container at leapt one data identifier and a data reference. Then, in the case where said means are more particularly in the form of a table of identifiers, the invention provides for a simultaneous creation of an entry in the table of identifiers upon the creation of a container or of the selection of a data item in a container.

The invention provides for the possibility of adapting a command of creation of a directory or a file so that during or upon completion of the creation of a directory or a file an entry in a table of identifiers can be assigned and created. Thus, said command for creating a directory or a file includes an additional parameter indicating that an entry of a table of identifiers must be simultaneously created.

While referring to FIG. 2, a command for creating a thus adapted directory or file includes parameters requested to enable the calculator 2 of the electronic device 1 to create an entry 100, 200 or 300, as well as the corresponding fields 101 to 104, 201 to 204 and 301 to 304.

The invention may provide for more generally adapting a command for creating a complex object in the memory of an electronic device. Thus, such a command may correspond to the creation of a secret the reference value of which is more particularly inserted among the "system" information of a directory describer.

In addition, the invention provides for the possibility of adapting a command for the selection of a directory or a file so that during or upon completion of said selection one entry in the table of identifiers can be assigned and created. Thus, said adapted command for the selection includes an additional parameter indicating that one entry of the table of identifiers must be simultaneously created. In relation with FIG. 2, the command for selecting the directory or the file includes parameters required so that the calculator 2 of the electronic device 1 can create one entry 100, 200 or 300 as well as the corresponding fields 101 to 104, 201 to 204, 301 to 304.

As an alternative solution, the invention provides for the possibility of adding specific commands enabling the association of an identifier with one data item and thus the creation of an entry in a table of identifiers instead of an adaptation of commands for creation and/or selection.

According to a preferred embodiment, during the creation of an entry in a table of identifiers, a data reference is directly deduced from the means for pointing the calculator in an electronic device. Thus, in relation with FIGS. 1 and 2, in order to update the value of a field 102, 202 or 302, the invention provides that the value of said fields can directly be deduced from the values of the pointers 21 and 22.

The creation of one entry can thus be substantially facilitated. In addition, for an electronic device liable to move in a memory, such as memory 11, the physical position of files and/or of directories during the utilisation of said device, the invention provides the entries of the table of identifiers, more particularly the data reference values, can be automatically maintained by the calculator or the electronic device consistent with the new locations of data.

According to a particular embodiment, the calculator of an electronic device according to the invention is able to assign a data identifier the value of which results from the incrementation or the decrementation of a counter. As an alternative solution, the value of the data identifier is determined during the assignment by the calculator from random numbers generation means existing in said calculator.

The invention also provides for the personalisation of the content of the memory of said calculator in a thus adapted electronic device, a method which includes one or several steps for associating one identifier with a data item of a container and one or several steps of processing said data item according to methods for assigning and/or processing according to the invention.

The invention thus makes it possible to provide, during the creation of common data, a table of identifiers the entries of which are used afterwards by an operator in order to personalise an electronic device. This personalisation process is very quick as compared with known solutions since a large number of commands, more particularly of selection are no longer necessary. This method also makes it possible to omit the mastering of containers by an operator. Such a thus adapted electronic device becomes capable of interpreting the table of identifiers and executing the operations provided and/or requested by the operator, thus offering a very flexible and simple use.

Although the invention has been described preferably in relation with chip cards, the latter also concerns any electronic device such as a passport, a dongle or any other object requiring personalisation of the content of a memory.

A quick personalisation (or processing) method for a chip card according to the invention is illustrated according to the main steps of a particular embodiment hereinafter and/or in parallel with the example disclosed above in the figures.

According to the particular embodiment, an application programme of the card includes a mechanism making it possible to personalise it very quickly.

In the example, the card processing unit is adapted to include means enabling the execution of an electric personalisation for which the duration of the process is minimised.

According to the particular embodiment or the example, the invention includes a separation of the creation of containers of the file, security object, directory types, data or records of values or contents.

According to the particular embodiment or the example, the following procedure is followed:
  determination of the data or the pieces of information, the value or values of which is/are to be downloaded into the card or preferably determination of the safety level requested to be able to update said data;
  creation of the data container in the card in association of an identifier with the data of the created containers. The association is preferably performed at the same time as the creation using assistance software during the creating of containers and the association provided for this purpose.

According to said particular embodiment, the association is performed via an identifiers memory map with respect to the containers or files with, if need be, other sorting parameters, more particularly a security level or common operations or simultaneous operations executed for processing a data item concerned by an identifier.

According to this particular embodiment, a command received by the card such as "Associate DGI to EF" will associate a value of an identifier with an elementary file of data (or container) which is current. In addition, each time this command is received, the value of the identifier is added to the software internal table in order to create a link between one area of the current file with the identifier.

In the example, the steps of creating a container and an association can be implemented by the card processing unit using software aboard a programme memory. According to a preferred embodiment in the example, the "data—identifier, data reference" are associated with a table of identifiers.

Thus, the software aboard makes it possible to use a container creation command in order to associate an identifier value with said created container, for example a file. Upon each creation of a data container, an identifier can then be associated using the table of identifiers if the data item is considered liable to be processed in the future in order to be personalised.

In order to minimise the time required for the personalisation process, the entries of the table of identifiers are preferably classified according to safety criteria and/or processing operations implying similar or common steps. Therefore, the container creation commands integrating a creation of an entry in the table of identifiers can be transmitted to the card in a selected and consistent order.

According to the particular embodiment, the method preferably includes a step of classifying identifiers (containers or data to be processed) according to security criteria and/or processing operations implying similar or common steps.

According to the particular embodiment still, the method includes a step of obtaining a list of identifiers and preferably in a classification order as indicated above for the subsequent processing of the data (values) in this order. Therefore, software sorts and classifies the identifiers according to the above criteria. Software is for example executed in answer to a command such as "Get DGI list" which sorts and communicates the list of identifiers as ordered by the sorting operation.

In the example, the processing unit has a sorting command for said table in order to arrange the table of identifiers according to safety criteria and/or processing operations implying similar or common steps upon completion of the creation of containers.

This command can be triggered from the outside world or automatically triggered by the card processing unit. The content of the table can also be read from the outside world so that the processing commands can be transmitted to a card in a consistent order.

An elementary file can be viewed as a plurality of data containers. In this case, several identifiers can be associated with said file.

According to said particular embodiment, the method preferably includes a preparation of a reference card while keeping the data containers empty (i.e. files, safety objects). The security policy is defined for the whole card and immediately applies to an application for personalisation (or processing).

In the example, thanks to the commands for creation of a container, a reference card can be prepared and duplicated into a batch of cards.

According to the particular embodiment, a personalisation (or processing) application preferably remains unmoved to let the final user make his or her own personalisation.

According to said particular embodiment still, the method includes a step of preparation of the database containing the information to be downloaded. The container identifiers are used to link the data in the base with the containers in the card.

Still according to this particular embodiment, the cards are personalised with the prepared data or information. For example, downloading (or selecting) commands contain at least the values of the data to be downloaded and a field for the identifier and maybe an associated safety level.

In the example, the cards are personalised one by one using the information prepared and grouped by means of a database of the users for example. Commands for updating data are transmitted to each card with a data value and identifier as parameters.

According to the particular embodiment, each safety object container preferably has a unique identifier which can be used upon the downloading of the final user's secrets into the card.

Still according to the particular embodiment, the personalisation application receives the command, retrieves the identifier therefrom and sees to it that the identifier or safety level corresponds to the one expected by the card as from the pre established classification. More particularly, the application sees to it that a secured channel is established possibly by anticipation.

Still according to the particular embodiment, the identifier extracted from the command is found in the table through the personalisation application as well as the container or file associated with the identifier (more particularly through the address thereof) in order to store therein the value or the piece of information associated with the identifier in the above-mentioned downloading command. The card downloading application can preferably be deactivated in the card afterwards.

In the example, the updating command according to the invention extracts the identifier and reads the table of identifiers of the card to be personalised.

In the example, while referring to FIG. 2, the table entry including a field 101, 201 or 301 including an identifier value similar to the identifier value used as a parameter enables the command to point the content in the memory and thus to execute the processing of the data item. The latter is pointed by means of the field 102, 202 or 302 associated with the identifier in the table of identifiers. According to an alternative utilisation, the whole or a part of the data updating command according to the invention can be deactivated upon completion of the personalisation process.

The invention claimed is:

1. A method for processing a data item of a container stored in a first memory device of an electronic device, the method comprising:
    consulting a table of identifiers that is stored in a second memory device, the table of identifiers includes one or several entries, each entry comprising:
    i) a data identifier that uniquely identifies the data item stored in the first memory device,
    ii) a data reference that is a pointer that points to the container in the first memory device where the data item is stored,
    iii) a processing script reference that is stored in association with the data identifier and that points to a processing script stored in a third memory device of the electronic device for processing the data item, and
    iv) a safety identifier that specifies a requested security level for the data item;
    sorting the table of identifiers so that the entries of the table of identifiers including an identical safety identifier are contiguous in the table of identifiers; and
    applying the processing script to the data item to process the data item, by using in the entry of the table of identifiers, the data reference to point to the data item of the container in the first memory device and the processing script reference for pointing to the processing script,
    wherein the consulting step comprises reading an entry of the table of identifiers, and said entry being dedicated to the data item to be processed and including the data identifier and the data reference, and
    wherein the processing step depends on the correct execution of a prior step of authorizing said processing step, said authorizing step using the safety identifier in the entry of the table of identifiers associated with the processed data item.

2. The method according to claim 1, further comprising executing a data item-reading process or a data item-writing process in response to reading or writing commands without using a selection of files upon the data item-reading process or the data item-writing process.

3. The method according to claim 1, wherein the processing step comprises reading or modifying the data item by using the data reference.

4. The method according to claim 1, further including:
    creating a data container or selecting a data of a container for initialising a second pointer pointing to said data in the first memory device of the electronic device; and
    associating with the data item a data identifier and a data reference the value which is defined by using the second pointer initialised by the step of creating a container or selecting a data item.

5. The method according to claim 1, wherein the processing step includes a step of personalization of an electronic device such as a chip card, a passport, a dongle or other object requiring personalization of the content of a memory device.

6. The method according to claim 1, further including:
    creating a data container or selecting a data of a container for initialising a second pointer to point to said data in the first memory device of the electronic device; and
    associating with the data a data identifier and a data reference the value which is defined by using the second pointer initialised by the step of creating a container or selecting a data item.

7. The method according to claim 6, wherein the associating step comprises creating an entry in the table of identifiers, said entry being dedicated to the data item and including the data identifier and the data reference.

8. The method according to claim 7, wherein the safety identifier makes future processing of the considered data item depend on the correct execution of an authorizing step.

9. The method according claim 7, wherein the step of creating an entry further comprises providing, in the entry of the table of identifiers the processing script reference.

10. The method according to claim 1, wherein the safety identifier is a code.

11. An electronic device including a first memory device for storing a data item in a container, comprising:
    a processor configured to consult a table of identifiers that is stored in a second memory device, said table of identifiers includes one or several entries each comprising:
    i) a data identifier that uniquely identifies the data item stored in the first memory device,
    ii) a data reference that is a pointer that points to the container in the first memory device where the data item is stored,
    iii) a processing script reference that is stored in association with the data identifier and that points to a processing script stored in a third memory device of the electronic device for processing the data item, and
    iv) a safety identifier that specifies a requested security level for the data item; and
    the processor is configured to apply the processing script to the data item to process the data item, by using in the entry of the table of identifiers, the data reference to point to the data item of the container in the first memory device and the processing script reference for pointing to the processing script, wherein the table of identifiers is sorted so that the entries of the table of identifiers including an identical safety identifier are contiguous in the table of identifiers, wherein when the processor consults the table of identifiers, an entry of the table of identifiers is read, and said entry being dedicated to the data item to be processed and including the data identifier and the data reference, and wherein the processing of the data item depends on the correct execution of a prior step of authorizing the processing of the data item, said authorizing using the safety identifier in the entry of the table of identifiers associated with the processed data item.

12. The electronic device according to claim 11, wherein:

the processor is configured to execute a data item-reading process or a data item-writing process in response to reading or writing commands without using a selection of files upon the data item-reading process or the data item-writing process.

13. The electronic device according to claim 11, further including:

a second pointer pointing to a data item of a container stored in the first memory device of the electronic device; and the processor initialises the table of identifiers to associate an identifier with a data item of a container able to implement the following operations:

creating a data container or selecting a data of a container for initialising the second pointer to point to the data item in the first memory device of the electronic device; and associating with the data item a data identifier and a data reference the value which is defined by using the second pointer initialised by the step of creating a container or selecting a data item.

\* \* \* \* \*